(12) United States Patent
Day et al.

(10) Patent No.: US 6,658,958 B2
(45) Date of Patent: Dec. 9, 2003

(54) POSITIVE LOCK-OUT

(76) Inventors: Edward L. Day, 4149 Fourth St., Wayne, MI (US) 48184; Sammy D. Thornsberry, 28931 Balmoral, Garden City, MI (US) 48135

(*) Notice: Subject to any disclaimer, the term of this patent is extended or adjusted under 35 U.S.C. 154(b) by 0 days.

(21) Appl. No.: 09/796,112

(22) Filed: Feb. 28, 2001

(65) Prior Publication Data

US 2003/0084742 A1 May 8, 2003

Related U.S. Application Data

(60) Provisional application No. 60/187,170, filed on Mar. 6, 2000.
(51) Int. Cl.[7] ............................. F16H 59/00; G05G 5/00
(52) U.S. Cl. ................................. 74/473.21; 74/473.23
(58) Field of Search ..................... 74/473.21, 473.22, 74/473.23, 473.28, FOR 102, 527; 192/220.2, 220.7

(56) References Cited

U.S. PATENT DOCUMENTS

| 1,646,970 | A | * | 10/1927 | Martel ..................... 74/473.23 |
|---|---|---|---|---|
| 2,025,253 | A | * | 12/1935 | Still ........................ 74/473.22 |
| 4,028,959 | A | * | 6/1977 | Long ...................... 74/473.23 |
| 4,118,999 | A | * | 10/1978 | Bieber ..................... 74/473.23 |
| 5,954,179 | A | * | 9/1999 | Osborn .................... 192/219.5 |

* cited by examiner

Primary Examiner—William C. Joyce
(74) Attorney, Agent, or Firm—Weiner & Burt, P.C.; Irving M. Weiner; Pamela S. Burt

(57) ABSTRACT

A positive lock-out adapter device which is interposed between the shifter of a vehicle and the transmission housing. The device positively prevents shifting into 5$^{th}$ gear and reverse.

1 Claim, 1 Drawing Sheet

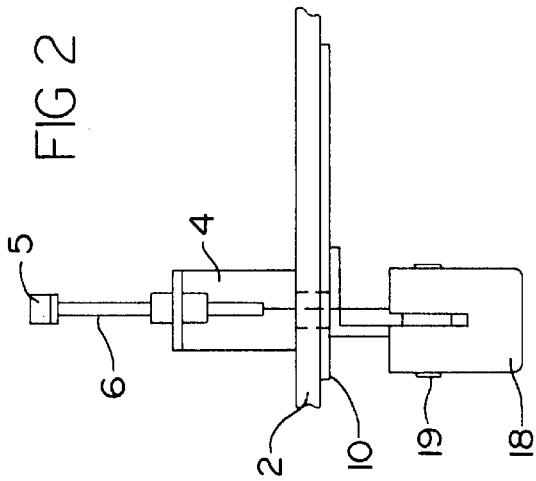
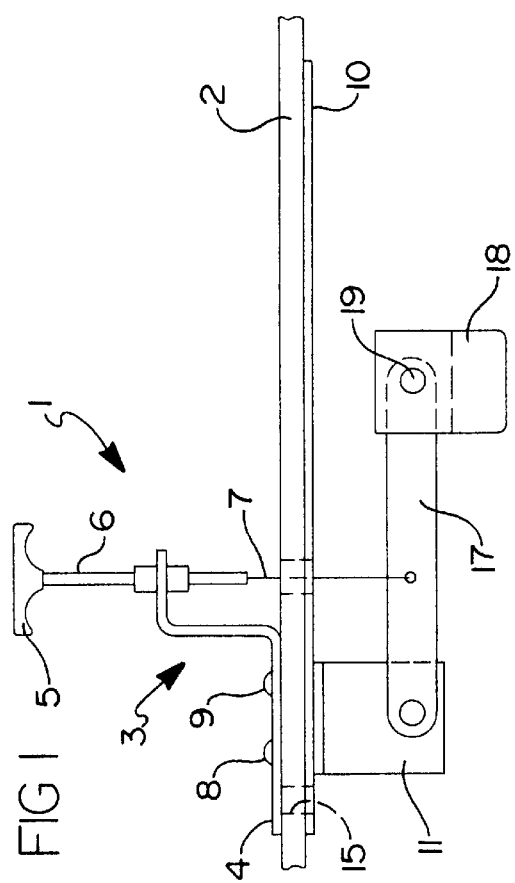
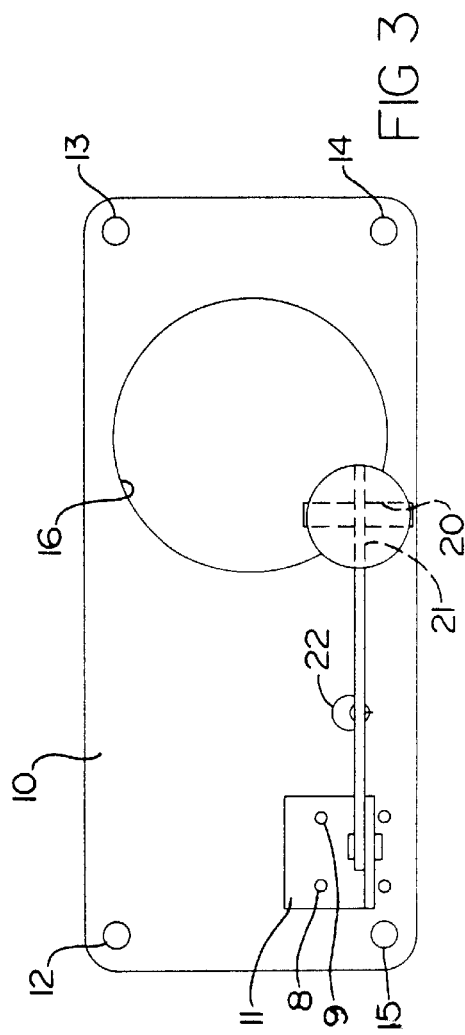

POSITIVE LOCK-OUT

RELATED PATENT APPLICATION

The present patent application is based on and claims priority from U.S. Provisional Patent Application Serial No. 60/187,170 filed on Mar. 6, 2000.

The present invention relates generally to a positive lock-out device, or a positive no-miss shifter adapter. In particular, the present invention relates to a device for preventing or positively stopping the transmission of a vehicle from shifting into $5^{th}$ gear and/or reverse.

BACKGROUND OF THE INVENTION AND DESCRIPTION OF THE RELEVANT ART

Oftentimes, the driver of a vehicle will inadvertently shift into $5^{th}$ gear and/or reverse when actually intending to shift into $3^{rd}$ gear or some other gear. It is desideratum of the present invention to positively and absolutely prevent this, especially during the racing of vehicles, such as a drag race.

Conventional techniques addressing this problem have proved inadequate, complicated, bulky, and/or expensive.

The relevant art is exemplified by the following United States patents.

U.S. Pat. No. 4,328,712 issued in 1982 to Osborn entitled "LOCKOUT FOR GIMBAL-TYPE AUTOMOTIVE TRANSMISSION GEAR SHIFTER" discloses a gear lock-out provided by a first gate disposed on a base. A detent is mounted for reciprocal movement with respect to the base. Biasing means is provided for biasing the detent into engagement with the base. The biasing means thereby prevents entry of the detent into the first gate, and thus provides a positive lockout for at least one gear.

U.S. Pat. No. 4,706,514 issued in 1987 to Schmidt entitled "GEAR SELECTOR FOR MANUAL TRANSMISSION HAVING REVERSE GEAR LOCKOUT" discloses a device to prevent inadvertent engagement of reverse gear. A pawl is rotatably mounted on a selector finger and is held by a spring-biased detent in one of two stable angular positions, which are aligned with and perpendicular to the direction of the gear shift channels. A stop and at least one control pin are provided on a gate plate to cooperate with the pawl.

U.S. Pat. No. 5,289,734 issued in 1994 to Parsons entitled "MANUAL TRANSMISSION SHIFTER ASSEMBLY WITH REVERSE INHIBITOR" discloses a shift inhibitor device located within a tower housing, and operable for inhibiting movement of the shift lever from the highest forward gear position into the reverse gear position.

Other relevant art is exemplified by: Best U.S. Pat. No. 2,193,928; Langridge et al. U.S. Pat. No. 2,858,707; and Sommer U.S. Pat. No. 2,920,505.

It is a desideratum of the present invention is to avoid the animadversions of the conventional devices and techniques.

The present invention, in addition to eliminating and/or avoiding the problems and disadvantages attendant to the conventional devices and techniques, provides a novel, simple, and inexpensive device possessing very new and desirable features, heretofore unattainable.

SUMMARY OF THE INVENTION

The present invention provides a novel positive lock-out device for a vehicle transmission.

The present invention provides a positive lock-out adapter device for preventing and/or positively stopping a transmission of a vehicle from shifting into fifth gear, overdrive, and/or reverse, comprising: a transmission including a transmission housing; a shifter operably connected to said transmission; and a positive lock-out adapter device operably interconnected with and interposed between said shifter and said transmission housing for preventing and/or positively stopping said transmission of said vehicle from shifting into fifth gear, overdrive, and/or reverse.

It is an object of the present invention to provide a novel device as described herein for preventing the shifting into $5^{th}$ gear or reverse.

Another object of the invention is to provide a novel device as described herein wherein the novel device is interposed between the shifter and the transmission housing.

A further object of the present invention to provide a novel device as described herein which is designed primarily for the racing of American-made vehicles.

Another object of the invention is to provide a novel device as described herein wherein the novel device provides a positive no-miss shifting from $2^{nd}$ gear to $3^{rd}$ gear.

Another object of the invention is to provide a novel device as described herein wherein the novel device provides a positive lock-out which can be operated by a plethora of control means, including but not limited to cable control, vacuum control, and/or electric solenoid.

Another object of the invention is to provide a novel adapter device as described herein wherein the novel adapter device is designed to operate preferably, but not necessarily, with General Motors 5-speed transmissions for the years 1983 through the present, as well as with Ford 5-speed transmissions for the years 1983 through the present.

Additional objects, features, and advantages of the invention will become apparent from the following detailed description and accompanying drawings.

BRIEF DESCRIPTION OF THE DRAWINGS

FIG. 1 illustrates an elevational view of a first embodiment of the invention.

FIG. 2 depicts an elevational view of the embodiment depicted in FIG. 1 taken from a side thereof.

FIG. 3 illustrates a bottom view of the FIG. 1 embodiment.

DETAILED DESCRIPTION OF ONE POSSIBLE PREFERRED EMBODIMENT OF THE INVENTION

With reference to FIGS. 1, 2 and 3, there is shown a preferred embodiment of the present invention in the form of a positive lock-out adapter device 1 which is interposed between the shifter 2 and the transmission housing.

The device 1 preferably, but not necessarily, includes a push-pull locking control means 3 having a cable bracket 4, a push-pull knob 5, a rod member 6, and a control cable 7. The push-pull knob 5 is affixed to the rod member 6, to which is secured the control cable 7.

The cable bracket 4 is bolted down by a bolt (not shown) which is disposed in a bolt hole 15 that is illustrated in FIGS. 1 and 3 and described hereinbelow.

The plate 10 of the positive lock-out adapter device 1 and the lever pivot bracket 11 may be welded or riveted together, for example, by spot rivets 8 and 9. The plate 10 preferably, but not necessarily, may take the form of a steel plate approximately 0.060 inches in thickness.

The plate 10 is provided with bolt holes 12, 13, 14 and 15 and a large circular aperture 16 to accommodate the factory or after-market shifter.

The lever 17 is pivotably secured at one end thereof to the lever pivot bracket 11. A substantially cylindrical plastic lock-out member 18 is secured to the other end of the lever 17 by means of a roll pin 19. The cylindrical member 18 is provided with an aperture 20 to accommodate the roll pin 19, and is also provided with a slot 21 to accommodate the lever 17.

The control cable 7 passes through an aperture 22 in the shifter 2 and the plate 10. The control cable 7 is secured to a predetermined location on the lever 17 which is adapted to pivot upwardly and downwardly in response to movement of the control cable 7.

When the knob 5 is down, the lock-out member 18 cooperates with the shifter to move the lock-out member 18 downwardly into the transmission housing to prevent shifting into $5^{th}$ gear, overdrive, or reverse.

When the knob 5 is pulled back up, the lock-out member 18 moves upwardly out of the transmission housing to permit the shifting into $5^{th}$ gear, overdrive, and/or reverse;

The operator of the vehicle cannot shift into $5^{th}$ gear or reverse unless the knob 5 is pulled up. Only at that point in time can the operator shift into $5^{th}$ gear or reverse.

When $5^{th}$ gear and reverse are bypassed or blocked, the operator cannot miss shifting from $2^{nd}$ gear into $3^{rd}$ gear, especially when drag racing.

The present invention thus provides a positive lock-out for overdrive and reverse for a plethora of transmissions, including, but not limited to, General Motors 5-speed transmissions for the years 1983 through the present, and Ford 5-speed transmissions for the years 1983 through the present. In particular, the positive lock-out adapter device 1 of the present invention will operate with many different transmissions including the Ford T5-T45-T45R Ford 5-speed transmissions.

The foregoing description is intended only to be illustrative, but not limiting, of the invention. The invention is intended to cover various modifications and equivalent arrangements. For example, the positive lock-out can be operated by a plethora of means, including but not limited to cable control, vacuum control, electric solenoid, etc.

The foregoing description is intended only to be illustrative, but not limiting, of the present invention. The present invention is intended to cover various modifications and equivalent arrangements which come within the scope of the invention and the appended claims.

There has been illustrated in the accompanying drawings and described hereinabove only one unique and novel preferred embodiment of the present invention which can be constructed in several different sizes and shapes.

It should be understood that many changes, modifications, variations, and other uses and applications will become apparent to those persons skilled in this particular area of technology and to others after having been exposed to the present specification and accompanying drawings.

Any and all such changes, modifications, variations, and other uses and applications which do not depart from the spirit and scope of the present invention are therefore covered by and embraced within the present invention and the following patent claims.

What is claimed is:

1. A positive lock-out adaptor device for preventing or positively stopping a transmission of a vehicle from shifting into $5^{th}$ gear, overdrive, and/or reverse, comprising:

a transmission including a transmission housing;

a shifter operably connected to said transmission;

a positive lock-out adapter device operably interconnected with and interposed between said shifter and said transmission housing for preventing and/or stopping said transmission of said vehicle from shifting into $5^{th}$ gear, overdrive, and/or reverse;

said device includes push-pull locking control means having a cable bracket, a push-pull knob, a rod member, and a control cable;

said push-pull knob is affixed to said rod member to which is secured said control cable;

said device includes a plate and a lever pivot bracket which are affixed together;

said plate is provided with an aperture to accommodate said shifter;

a lever having a first end thereof pivotally secured to said lever pivot bracket;

a lock-out member secured to a second end of said lever;

said control cable passes through an aperture in said cable bracket and said plate;

said control cable secured to a predetermined location on said lever which is adapted to pivot upwardly and downwardly in response to movement of said control cable; and wherein when said push-pull knob is down, said lock-out member cooperates with said shifter to prevent shifting into $5^{th}$ gear, overdrive and/or reverse, and when said push-pull knob is pulled up, said lock-out member permits shifting into $5^{th}$ gear, overdrive and/or reverse.

* * * * *